H. C. WHITAKER.
CONVERTIBLE SEAT AND BACK REST.
APPLICATION FILED SEPT. 28, 1914.
1,216,029. Patented Feb. 13, 1917.
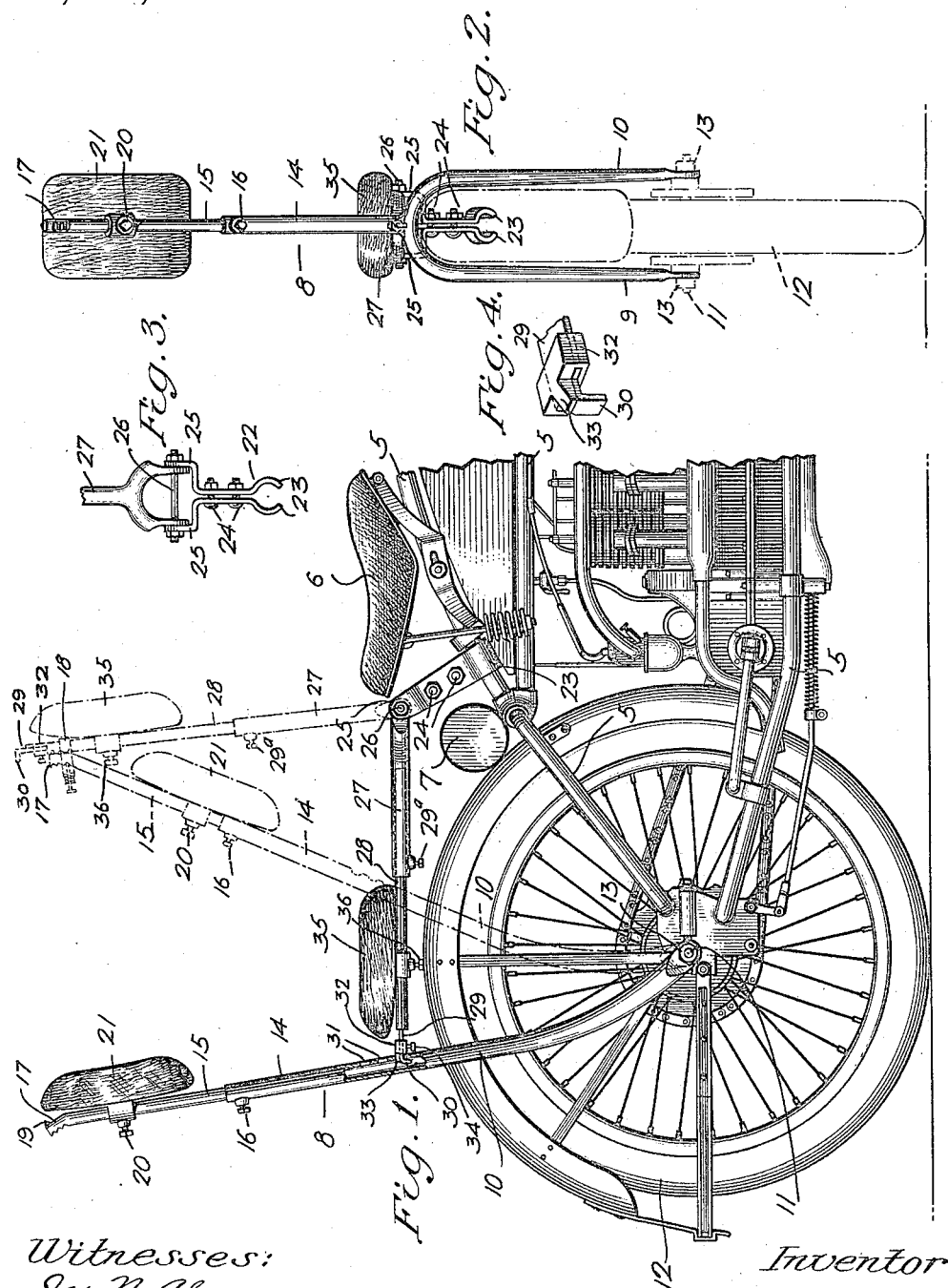
Witnesses:
Jas. N. Alexander,
William H. Balls
Inventor:
Herbert C. Whitaker

UNITED STATES PATENT OFFICE.

HERBERT C. WHITAKER, OF PHILADELPHIA, PENNSYLVANIA.

CONVERTIBLE SEAT AND BACK-REST.

1,216,029.  Specification of Letters Patent.  Patented Feb. 13, 1917.

Application filed September 28, 1914. Serial No. 863,981.

*To all whom it may concern:*

Be it known that I, HERBERT C. WHITAKER, a citizen of the United States, residing at Philadelphia, in the county of Philadelphia and State of Pennsylvania, have invented a new and useful Convertible Seat and Back-Rest, of which the following is a specification.

My invention relates to a new and convertible seat and back-rest, which may be advantageously—but not exclusively—used as applied to a bicycle or motorcycle frame. Briefly, it consists of having a pivoted support connected to the frame of the bicycle or like structure, and a seat is placed on this support to carry another rider.

The support is braced at the rear or free end by an upright, pivotally connected to the axle or frame of the bicycle. At the free or upper end of this upright I place a cushion which is used as a back-rest for the rider who sits upon the rear seat mentioned above. If only one person rides on the bicycle then the support is swung upwardly which provides a back-rest for the operator of the bicycle. This support is then braced by the upright before mentioned as the top of the upright is swung forwardly to brace the support.

The many advantages and uses of this device are apparent. I attain these objects by the device illustrated in the accompanying drawing which shows one practical embodiment of my invention, but the construction shown therein is to be understood as illustrative only, and not as defining the limits of my invention.

In the drawings, Figure 1 shows a side elevation of my device as applied to a motorcycle.

Fig. 2 is a rear elevation, a motorcycle being shown in dotted lines.

Fig. 3 is a detail view showing the means of attaching the device to the motorcycle frame, and Fig. 4 is a perspective view showing the means of locking the support to the upright.

Similar numerals refer to similar parts throughout the several views.

Referring to the said drawings:

Numeral 5 represents the frame of a bicycle or motorcycle to which is attached in the usual manner the main seat 6 and a tool-box 7.

Numeral 8 represents an upright the two lower arms of which, 9 and 10, are connected to the axle 11 of the rear wheel 12. The lower arms 9 and 10 of the upright 8 are parallel and upwardly converge into an upper arm 14. The upright 8 is preferably made tubular and into the upper end of the arm 14 is seated a rod 15, said rod being adjustable longitudinally in the upper arm 14 by means of a thumb screw 16. The upper end of the rod 15 is slightly bent, as shown at 17, and has a plurality of notches well shown in Figs. 1 and 2. Numeral 18 represents an annular ring having a spring-controlled pawl, well shown in dotted lines in Fig. 1. 19 shows a small pin,—the purpose of these several parts to be hereinafter described.

Slidably mounted on the rod 15 and adjustably held by thumb screw 20 is a cushioned pad 21. This pad 21 is used as a back-rest or cushion against which to brace the shoulders and by means of thumb screws 16 and 20, the pad 21 may be placed at any convenient height.

Upon the frame 5 and behind the seat 6 is a clamping device 22 consisting of two jaws 23, operated by bolts 24. Any other suitable means of attaching the device to a bicycle or motorcycle frame may be used, depending on the model of the vehicle. The other end of the clamping member consists of two ears 25 through which is passed a pin 26, and pivotally mounted on the pin 26 is a tubular support or standard 27. Slidably mounted in this tubular member 27 is a rod or shaft 28 and this rod or shaft 28 is held in the tubular member 27 by means of a thumb screw 29$^a$.

The free end of the rod 28 is flattened into a finger 29 and bent into a hook 30, as clearly shown in Fig. 4. This hook 30 fits into openings or slots 31 cut in the upright 8, and the hook 30 is prevented from being disengaged from the slot or opening 31 by means of a catch 32 which has an inclined side 33. This inclined side acts as a wedge and after the hook 30 has been inserted in the opening the wedge is pushed in the opening and securely held in place by means of a thumb screw 34. By the above means the support or standard 27 is locked with the upright 8 but any other well known means could be advantageously used.

Slidably mounted on the shaft 28 is a cushioned pad 35 and this pad is adjustably held in position by a thumb screw 36.

Owing to the fact that the standard or support 27 is pivotally mounted on the pin 26, the support or standard may take the upright position as shown in dotted lines in Fig. 1 or else it may be moved through approximately 90° until it reaches the position shown in full lines in Fig. 1. When used in the position shown in dotted lines, the pad 35 is used as a back-rest to support the shoulders and give a convenient and comfortable position to the main or front rider. In this position shown in dotted lines the upright 8 acts as a brace. The free ends of the upright 8 and the support or standard 27 are securely held by the ring 18 being passed over the top of the two members and it is obvious that the standard or support may be placed at any convenient angle. If it is desired that two riders use the machine then the ring 18 is removed, the upright 8 thrown backward, and the hook 30 is then brought down to enter one of the openings 31. The second or rear rider will then sit upon the pad 35 and rest his shoulders against pad 21 as the drawings will clearly show.

The adjustable connections may be made in any convenient manner and many changes may be made in the mere details of construction without departing from the spirit of my invention.

Having thus described my invention, what I claim as new and desire to secure by Letters Patent is:—

1. A support pivotally connected to a motorcycle and having a hook at its free end, a seat mounted on said support, in combination with an upright adapted to be attached to the rear portion of the frame of a motorcycle, said upright having openings into which said hook is inserted for positive connection between the support and the upright.

2. A support pivotally connected to a motorcycle, a seat mounted on said support, in combination with an upright pivotally attached to the rear portion of the frame of a motorcycle, said upright holding seat and support in operative position, a hook on the support connecting said support and upright, said hook being capable of holding the upright and support in different positions.

3. The combination of a support pivotally connected to a motorcycle, said support turning about its pivot to assume substantially horizontal or vertical positions and an upright pivotally connected to the motorcycle and means whereby said upright is adjustably connected with said support to hold the same in either of said positions.

4. The combination of a support pivotally connected to a motorcycle, said support turning about its pivot to assume substantially horizontal or vertical positions and an upright pivotally connected to the motorcycle and means whereby said upright is detachably connected with said support to hold the same in either of said positions.

5. The combination of an upright, pivotally mounted on a bicycle frame and a standard pivotally connected to said frame at a point forward of said upright, a back-rest mounted on said standard, the free ends of said upright and standard being adjustably connected to hold said standard in a back supporting position.

6. The combination of an upright, connected at its lower end to a bicycle frame, a back-rest mounted on the free end thereof and a rear seat support connected at its forward end to said frame, the free end of said support being connected with said upright.

7. The combination of an upright, pivotally mounted at one end on a bicycle frame, a back-rest slidably mounted on the free end thereof and a rear seat support pivotally mounted at one end thereof on said frame, the free end of said support being adjustably and detachably connected with said upright.

8. In a motorcycle attachment, a hollow standard having a rod telescoping therein with a back-rest mounted on the rod in combination with an upright to support said standard in back supporting position, said upright being pivotally mounted at its lower end on the rear axle of a motorcycle, and adjustable means to connect the outer ends of said standard and upright.

9. The combination of a support, a seat mounted on said support said seat being adapted to carry the rear rider on a motorcycle and an upright mounted on the rear axle of said motorcycle and connected to said support and extending above said support and seat, said upright being adapted to be used as a back-rest for the rear rider.

10. In a motorcycle, the combination with a support pivotally connected to the frame of the motorcycle an upright pivotally connected to the frame of the motorcycle and connecting means between said support and upright, whereby when said support is used as a seat or as a back-rest, said support will be maintained in position by said upright.

11. In a motorcycle, the combination of an upright having a plurality of openings and a rear seat support, pivotally connected at one end to the motorcycle, said support having a hook at its other end to engage in one of said openings to maintain the support in operative position and means to clamp the hook therein.

12. In a motorcycle, a back-rest for the main rider, said back-rest being supported in position by an upright, said upright being pivotally mounted on the rear axle of a motorcycle, the outer ends of said back-rest and upright being adjustably connected.

13. A substantially horizontal member supported at one end and having a hook at the other end thereof, in combination with a substantially vertical member having a plurality of apertures in the side thereof, the above mentioned hook entering and engaging the above mentioned aperture, and a wedge shape catch slidable on said horizontal member to firmly hold said hook in said aperture.

14. In a seat attachment for motorcycles, a back-rest carrying standard having pivotal connection with the rear axle of a motorcycle, a seat carrying standard pivotally connected with a motorcycle and adapted for locking engagement with the first mentioned standard when the seat carrying standard is in a horizontal position, said seat carrying standard being adapted to be moved to a vertical position to provide a back-rest, and means for holding the seat carrying standard in a vertical position.

15. In a seat attachment for motorcycles, a back-rest carrying standard having pivotal connection with the rear axle of a motorcycle, and a seat carrying standard pivotally connected with the motorcycle, said standards being adapted for locking engagement to hold the said seat carrying standard in either a horizontal or vertical position.

16. In a seat attachment for motorcycles, a back-rest carrying standard having pivotal connection with the rear axle of a motorcycle and adapted for vertical pivotal movement, and a seat carrying standard pivotally connected with the motorcycle and also adapted for vertical pivotal movement, the back-rest carrying standard being adapted to be moved forward and engage with the seat carrying standard when the same is in a vertical position.

17. In a seat attachment for motorcycles, a back-rest carrying standard having pivotal connection with the rear axle of a motorcycle and adapted for vertical pivotal movement, and a seat carrying standard pivotally connected with the motorcycle and also adapted for vertical pivotal movement, the back-rest carrying standard being provided with serrations, a ring carried by the seat carrying standard, and a spring actuated pawl carried by the ring adapted to be engaged in the serrations to hold the standards together when the seat carrying standard is in a vertical position.

In testimony whereof, I hereby affix my signature in the presence of two witnesses.

HERBERT C. WHITAKER.

Witnesses:
H. Ross Smith,
A. A. McCrone.

Copies of this patent may be obtained for five cents each, by addressing the "Commissioner of Patents, Washington, D. C."